(12) United States Patent
McNamee (10) Patent No.: US 6,929,460 B2
(45) Date of Patent: Aug. 16, 2005

(54) DOUGH HANDLING APPARATUS (75) Inventor: Ronan McNamee, Dartry (IE)

(73) Assignee: Irish Bakery Inventions Limited, Dublin (IE)

( * ) Notice: Subject to any disclaimer, the term of this patent is extended or adjusted under 35 U.S.C. 154(b) by 16 days.

(21) Appl. No.: 10/611,463

(22) Filed: Jun. 30, 2003

(65) Prior Publication Data
US 2004/0028766 A1 Feb. 12, 2004

(30) Foreign Application Priority Data
Jul. 3, 2002 (IE) .......................................... S2002/0550

(51) Int. Cl.⁷ ............................................. A21C 11/10
(52) U.S. Cl. .................... 425/216; 425/298; 425/403.1; 426/512; 426/518; 83/105; 83/112; 83/620
(58) Field of Search ................................ 425/102, 216, 425/217, 298, 403.1, 806; 426/508, 512, 518; 83/105, 107, 112, 620

(56) References Cited

U.S. PATENT DOCUMENTS

| | | | |
|---|---|---|---|
| 2,538,937 A | 1/1951 | Foster ......................... | 99/404 |
| 3,340,792 A | 9/1967 | Matzke ........................ | 99/405 |
| 3,603,243 A | 9/1971 | Foster ......................... | 99/355 |
| 3,757,672 A | 9/1973 | Szabrak et al. ............... | 99/404 |
| 3,793,937 A | 2/1974 | Lipoma ....................... | 99/355 |
| 3,812,775 A | 5/1974 | Sijbring ...................... | 99/404 |
| 3,819,837 A | 6/1974 | Keith et al. .................. | 426/27 |
| 4,192,899 A * | 3/1980 | Roth .......................... | 426/513 |
| 4,195,489 A * | 4/1980 | Bernard ....................... | 62/63 |
| 4,689,236 A | 8/1987 | Pinto .......................... | 426/502 |
| 4,694,742 A | 9/1987 | Dover ......................... | 99/404 |
| 4,694,743 A | 9/1987 | Groff .......................... | 99/405 |
| 5,322,006 A | 6/1994 | Morioka et al. .............. | 99/405 |
| 5,493,956 A | 2/1996 | Larsen ........................ | 99/404 |
| 5,580,598 A | 12/1996 | Benson et al. ............... | 426/438 |
| 5,630,358 A | 5/1997 | Patel ........................... | 99/349 |
| 5,673,609 A | 10/1997 | Sanchez et al. ............... | 99/353 |
| 5,861,185 A * | 1/1999 | Capodieci .................... | 426/238 |
| 5,988,051 A | 11/1999 | Hashiguchi et al. .......... | 99/472 |
| 6,073,540 A | 6/2000 | Garrett ........................ | 99/330 |
| 6,245,370 B1 | 6/2001 | Pilati et al. .................. | 426/289 |
| 6,467,398 B2 | 10/2002 | Fink et al. .................... | 99/330 |
| 6,467,401 B2 | 10/2002 | Caridis et al. ................ | 99/353 |
| 2004/0028767 A1 * | 2/2004 | McNamee ................... | 425/298 |
| 2004/0060453 A1 * | 4/2004 | McNamee ................... | 99/330 |

FOREIGN PATENT DOCUMENTS

| | | |
|---|---|---|
| DE | 2159074 | 5/1972 |
| DE | 20014175 | 12/2000 |
| EP | 0382105 | 8/1990 |
| EP | 0 903 084 | 3/1999 |
| GB | 767 255 | 1/1957 |
| GB | 2151174 | 7/1985 |
| IE | 960202 | 10/1996 |
| JP | 5177590 | 7/1993 |

OTHER PUBLICATIONS

Search report GB 0315424.2, Nov. 24, 2003.
Search report GB 0315435.8, Jan. 6, 2004.
Search report GB 0315243.6, Dec. 23, 2003.

* cited by examiner

*Primary Examiner*—Donald Heckenberg
(74) *Attorney, Agent, or Firm*—Baker, Donelson, Bearman, Caldwell & Berkowitz (57) ABSTRACT A dough cutting apparatus is disclosed including a plurality of dough cutting members (6), each of which is adapted for cutting a desired shape out of a strip of dough. Each dough cutting member is spaced apart from an adjacent cutting member by a predetermined distance so that when each cutting member cuts a dough cut-out from the strip of dough, there is a relatively narrow web (101) of waste dough produced in the region between adjacent dough cutting members. There is also a waste dough web removing apparatus (50) which has a plurality of fingers (51, 52, 53) for urging the waste dough web upwardly for separation from the dough cut-outs.

11 Claims, 8 Drawing Sheets

DOUGH HANDLING APPARATUS

FIELD OF THE INVENTION

The present invention concerns improvements in and relating to dough handling apparatus and in particular to apparatus for handling small portions of dough cut out from a strip of dough in the production of mini bite-size confectionary products such as mini-doughnuts, for instance.

The small dough portions cut-out of the dough strip are referred to as doughbits.

DESCRIPTION OF RELATED ART INCLUDING INFORMATION DISCLOSED UNDER 37 CFR 1.97 AND 1.98

The prior art method of cutting out a desired shape from a dough strip was devised for dough portions which are significantly larger (about 4 times larger) than the size of the doughbits capable of being produced by the apparatus of the present invention. The prior art method comprised cutting the dough strip into abutting hexagonally shaped dough segments. The prior art method does not work well when used for cutting out the smaller doughbit dough portions as there are technical problems encountered when trying to separate the smaller dough segments from each other resulting in tearing of the dough and mis-shapen dough portions.

Furthermore, the small doughbits have heretofore been made manually, as it is extremely difficult to automate the production line for the smaller size doughbits, in particular, it is difficult to get the hexagonally shaped segments aligned in a row in order to carry out the later "proving" stage in the overall confectionary production process.

The present invention seeks to alleviate the problems associated with the known dough handling apparatus when handling smaller sized products.

BRIEF SUMMARY OF THE INVENTION

The present invention accordingly provides a dough handling apparatus comprising a dough cutting apparatus including a plurality of dough cutting members, each dough cutting member being adapted to be brought into contact with a travelling strip of dough or cutting a desired shape out of the strip of dough, each dough cutting member being paced apart by a predetermined distance from an adjacent cutting member in a plane cross the dough cutting apparatus which is transverse to the direction of travel of the strip of dough so that when each cutting member cuts a dough cut-out from the strip of dough, a relatively narrow web of waste dough is produced in the region between adjacent dough cutting members, and a waste dough web removing apparatus for separating the waste dough web from the dough cut-outs, the web removing apparatus including at least one finger for urging the waste dough web upwardly for removal from the dough cut-outs while enabling the dough cut-outs to remain in situ.

This arrangement has the advantage that the small sized doughbits are separated in the transverse plane by a web of waste dough which can be subsequently removed without damaging the doughbits.

Conveniently the dough cutting members are arranged linearly transversely across the dough cutting apparatus so that, in use, a single stroke of the cutting apparatus produces a line (column) of doughbits from the strip of dough with a waste dough web separating adjacent doughbits in the transverse plane.

Ideally, each cutting member is adapted to make sequential cutting strokes in a travelling longitudinal strip of dough passing beneath the cutting apparatus on a moving conveyor, the cutting strokes being timed and spaced so that the distance between adjacent dough cutouts in the longitudinal plane which is perpendicular to the transverse plane of the apparatus is zero and the dough cut-outs produced by a given cutting member are arranged in a column parallel to the direction of travel with a longitudinally extending web of waste dough being produced between adjacent columns. Thus, the dough cut-outs abut each other in the longitudinal plane. This has the advantage of maximising the usage of the dough strip.

Preferably the dough cutting member is fixedly mounted on a stamping apparatus so that in use, on a downward stroke of the stamping apparatus, the dough cutting member is brought into contact with the strip of dough, thereby cutting the desired shape in the dough.

Advantageously, the cutting profile of each dough cutting member is generally oval so that each dough doughbit cut out of the dough strip is also generally oval in shape. This has the advantage that when each of these product undergoes the "proving" stage of the process, the resultant confectionary product assumes a generally spherical shape.

Conveniently, the dough cutting apparatus comprises a pre-determined number of dough cutting members so that with a single downward stroke of the dough cutting apparatus, the corresponding number of dough cut-outs are produced.

Conveniently, in use, the dough cutting members are brought into contact with the strip of dough which is moving on a conveyor belt underneath the cutting apparatus.

Advantageously, the at least one finger comprises a sprocket wheel having a plurality of teeth arranged around the rim thereof.

Conveniently, the at least one finger also includes at least one roller rotatably connected to the sprocket wheel.

Ideally, the web removing apparatus includes a plurality of said fingers, arranged at predetermined separations, along the length of a rotatable shaft whereby the doughbits produced by the cutting apparatus may pass through the space provided between adjacent fingers while the waste dough web is urged upwardly for removal by a rotating conveyor. The waste dough webs are removed for re-working, hence there is minimal wastage associated with the production process using the dough handling apparatus of the invention.

The invention will now be described more particularly with reference to the accompanying drawings in which are shown one embodiment of the mini-dough handling apparatus of the invention.

DETAILED DESCRIPTION OF THE INVENTION

Referring to the drawings and initially to FIGS. 1 to 4, the dough cutting apparatus will be described.

Figure 4:
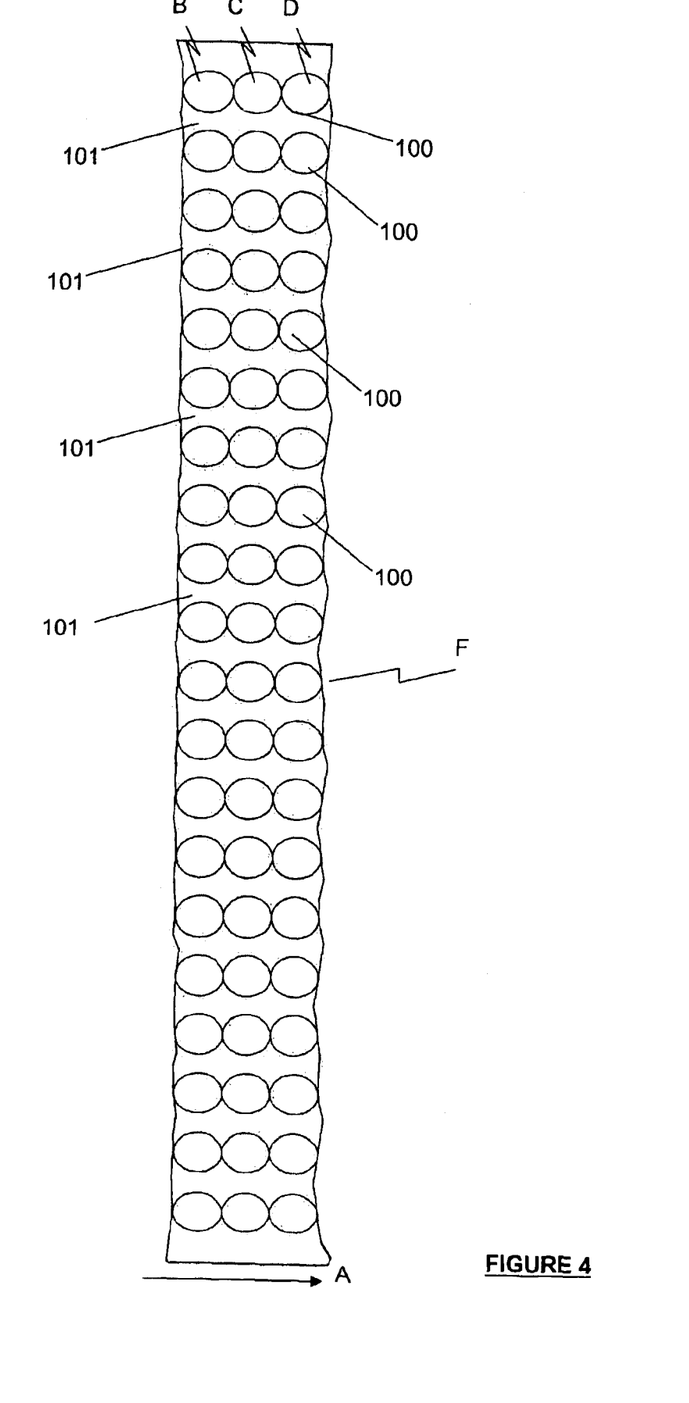
FIG. 4 is a plan view of a portion of the strip of waste dough with three columns of the doughbits having been cut out of the dough strip after three downward strokes of the cutting apparatus; the section shown in FIG. 4 comprises the unit which is repeated continuously along the strip of waste dough which is travelling along a conveyor belt in the direction of arrow A.

The cutting apparatus is indicated generally by reference numeral 1 and comprises a cutting head 2 for cutting out small dough portions (doughbits) 100 used for producing mini bite size confectionary products. The cutting head 2 is fixedly attached to a standard stamping unit 3 by means of five spring-loaded bolts 5. The cutting head 2 comprises individual cutting positions 6. Each cutting position 6 cuts out doughbits 100 and there are twenty such cutting positions 6 provided on the cutting head 2. Thus the maximum number of doughbits 100 which can be cut out of a dough strip per stroke of the cutting apparatus 1 is twenty doughbits. There is a spacing of 16 mm in the transverse direction, between the profile of each adjacent cutting position 6. This spacing between adjacent cutting positions 6 allows the dough sheet to be transformed, after a single stroke of the cutting apparatus 1, into a line of doughbits, each doughbit being indicated by reference numeral 100 separated in the transverse plane by webs 101 of waste dough. As shown in FIG. 4, after three downward strokes of the cutting apparatus, a series of webs 101 of waste dough strips have been formed, together with three columns B, C, D of doughbits 100, each column including twenty doughbits.

The distance between each cutting profile 6 in the longitudinal direction is zero. This means that in any single row comprising doughbits 100, the doughbits abut each other as shown in FIG. 4. This arrangement allows for maximum dough sheet utilization in the longitudinal plane.

The profile of each cutting position 6 on the cutting head 2 is generally oval shaped and thus the doughbits 100 are formed as generally oval shaped dough portions. This enables doughbits to form into a substantially spherically-shaped ball following the proving and frying stages of the mini-doughnut production process.

Figure 1:
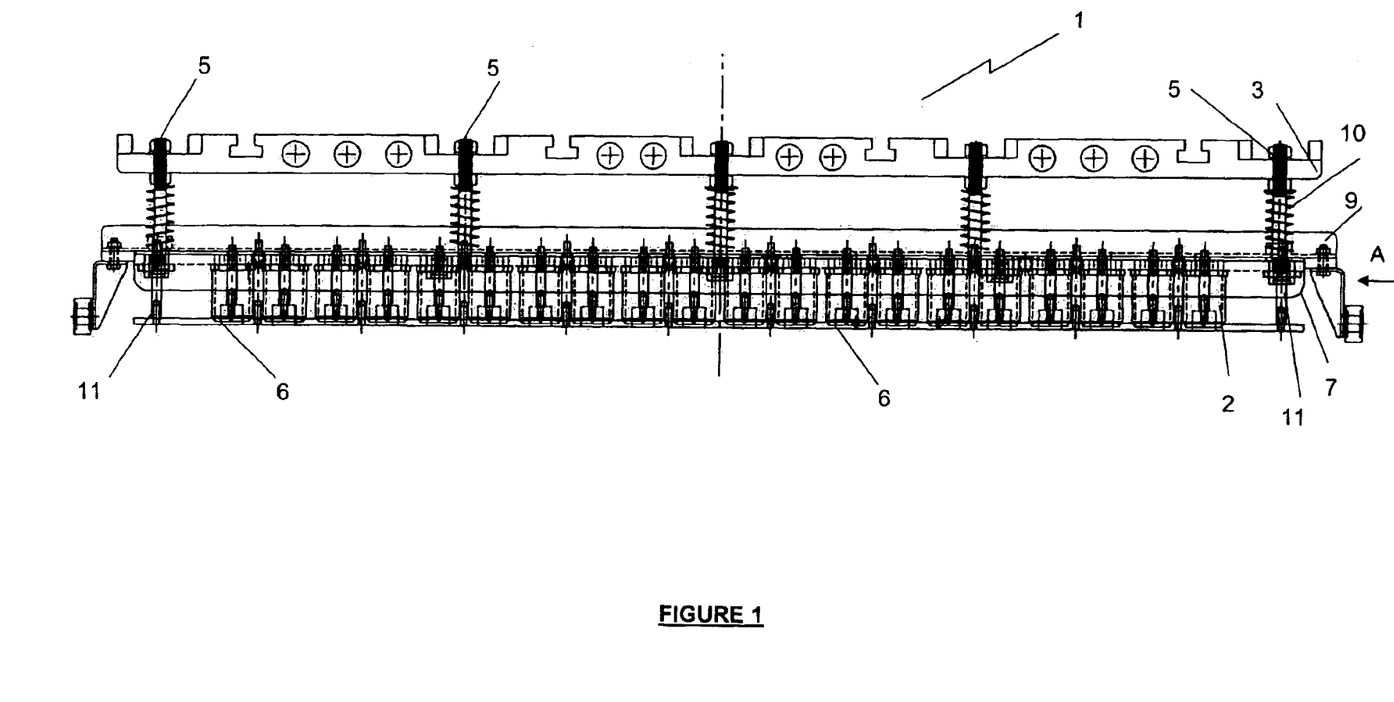
FIG. 1 is a side view of the mini-dough stamping cutting apparatus.
Figure 1A:
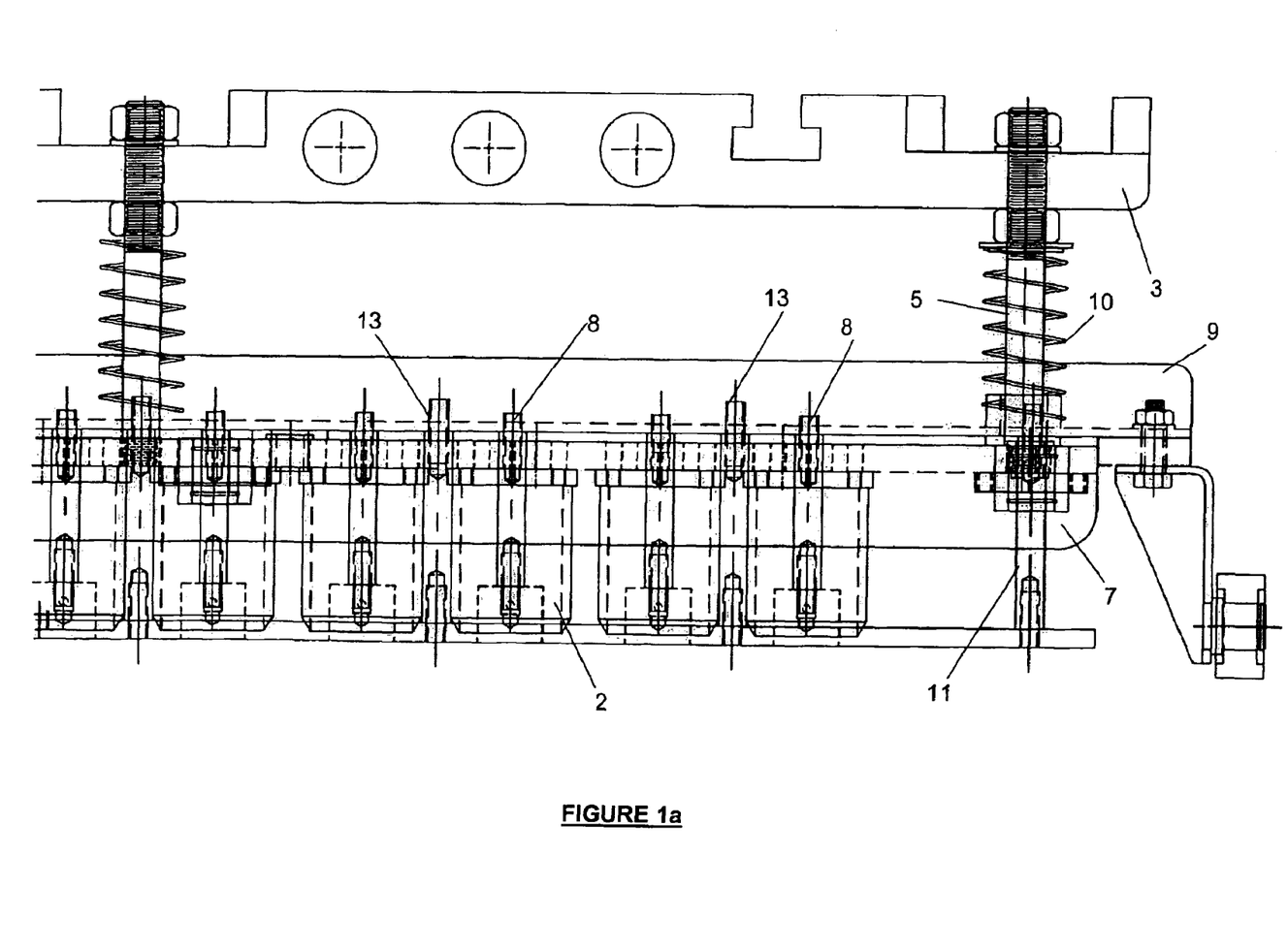
FIG. 1a is an exploded view of a portion of the cutting apparatus shown in FIG. 1.
Figure 2:
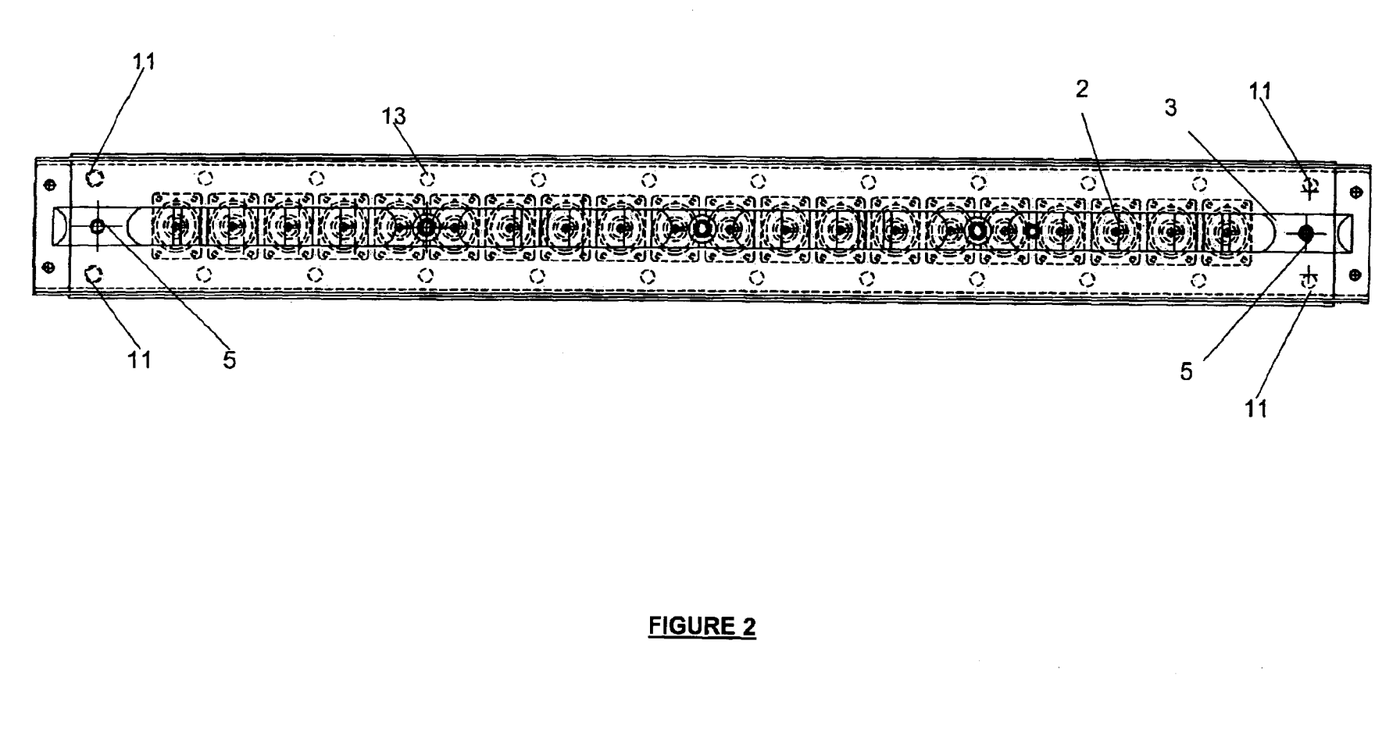
FIG. 2 is a plan view of the stamping cutting apparatus shown in FIG. 1.
Figure 3:
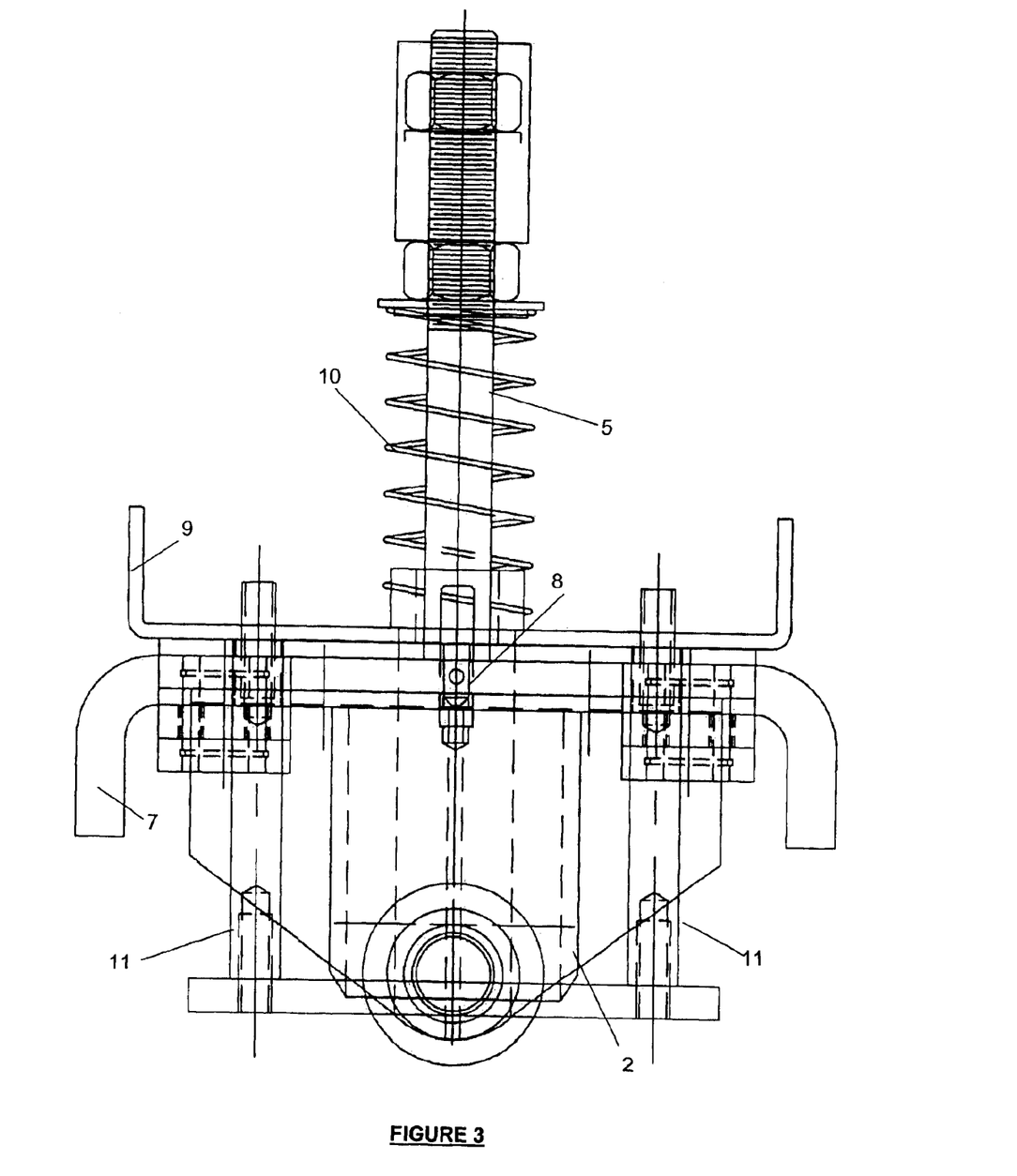
FIG. 3 is an exploded side view of the cutting apparatus in the direction of arrow A marked on FIG. 1.

Referring now to FIG. 3, the cutting heads 2 are fixedly attached to a bracket-shaped panel 7 by means of bolts 8. Spring loaded bolts 5 are fixedly attached to the stamping unit 3 at the upper end and are fixedly attached to the bracket-shaped panel 9 at the lower end. Panels 8 and 9 are fixedly attached to each other by means of bolts 13. The springs 10 provide damping effect at the end of each stroke and the bars 11 at each corner of the cutting apparatus 1 can act as a guide bar during the downward stroke.

Figure 5:
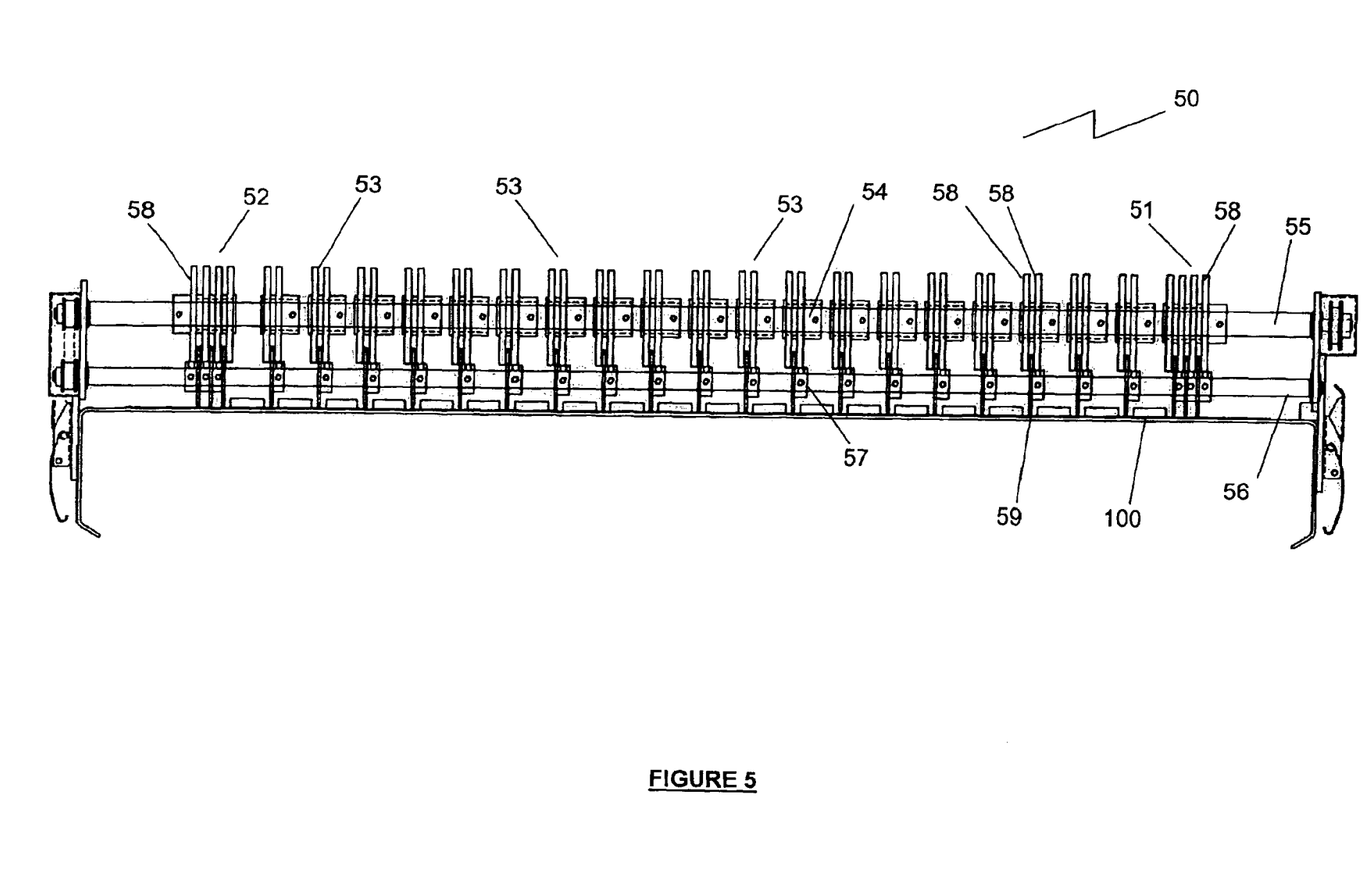
FIG. 5 is a front view of the self-threading web removing apparatus of the invention.
Figure 6:
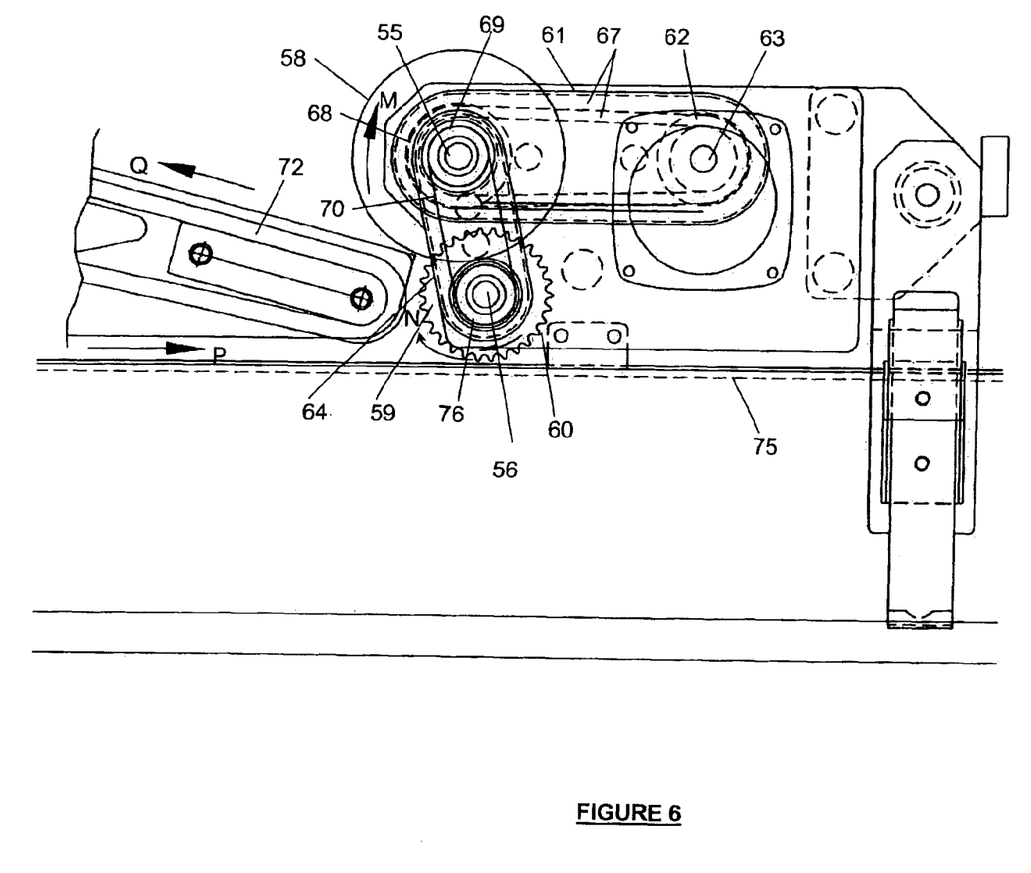
FIG. 6 is a side view of the self-threading web removing apparatus shown in FIG. 5.
Figure 7:
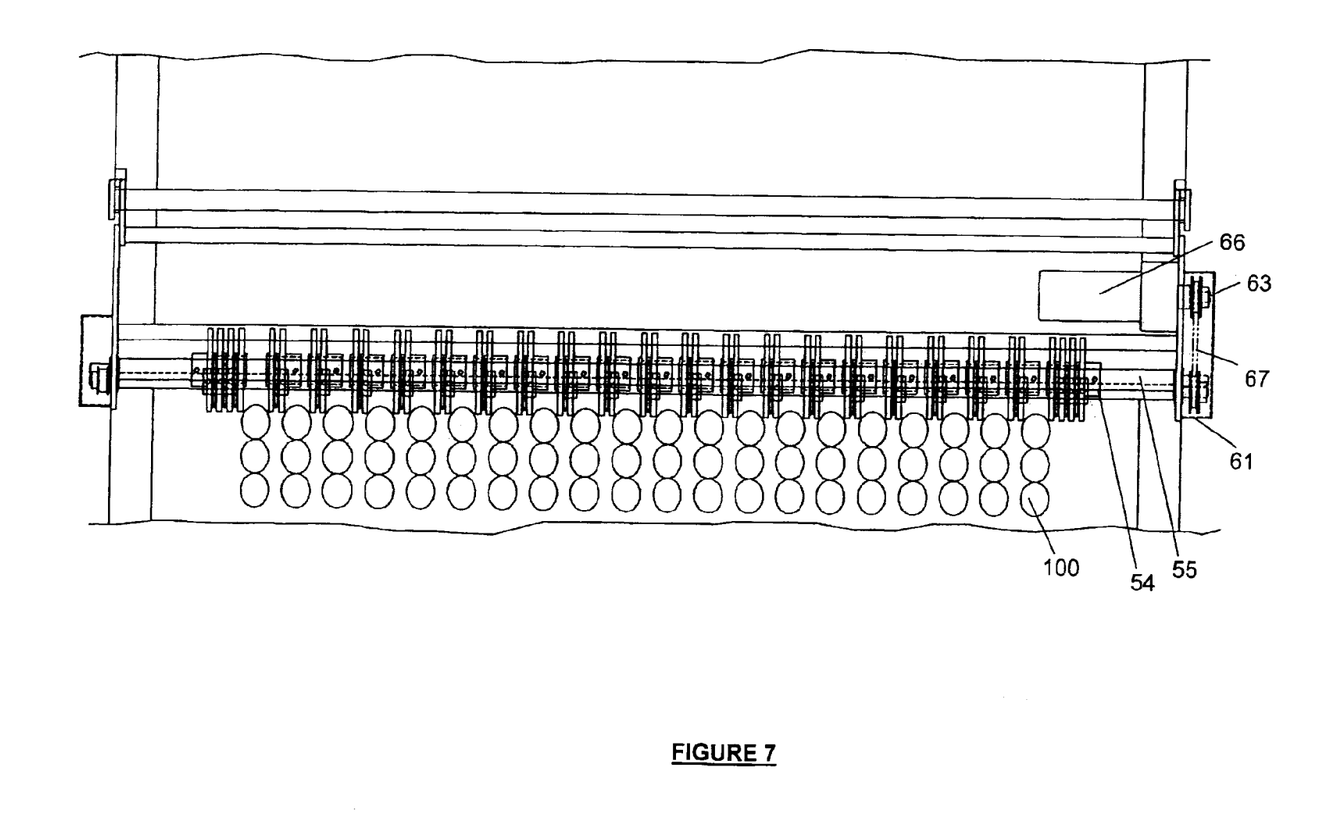
FIG. 7 is a plan view of the self-threading web removing apparatus with the sprockets wheels of the web removing apparatus underneath the waste dough strip and the rows of the mini-dough (doughbit) pieces pass through the spaces provided between adjacent roller and sprocket assemblies.

Referring now to FIGS. 5 to 7, inclusive, the self-threading waste dough sheet web removing apparatus will be described. The waste dough sheet web removing apparatus is indicated generally by reference numeral 50 and includes two side edge waste dough web removal members 51, 52, respectively together with nineteen intermediate waste dough web removal members 53. The intermediate web removal members 53 are arranged at equidistant spacing from each other, along the length of driving shafts 55, 56. Each intermediate waste dough web removal member 53 comprises two rollers 58 and a sprocket wheel 59. The width across the two rollers 58 of each intermediate web removal member 53 corresponds with the width of each waste dough strip 101. The rollers 58 are fixedly mounted on cylinders or bushes 54 which are in turn fixedly mounted on shaft 55 so that the rollers 58 rotate with the drive shaft 55 in the direction of arrow M.

Each of the two side edge web removal members 51, 52 comprise four rollers 58', so as to have the necessary width to correspond with the width of the right hand side and left hand side edges, respectively, of the waste dough sheet, since the side edges can be wider than the width of the waste dough strips 101 between the doughbits 100. Each of the two side edge web removal members 51, 52 comprise three sprocket wheels 59' so as to pick up any extra waste web dough which may be present along the edges of the dough strip. Each sprocket wheel 59 has a plurality of teeth 60 projecting radially from the rim of the sprocket wheel 59. Each sprocket wheel 59 is fixedly mounted on a cylinder or bush 57 which in turn is fixedly mounted on shaft 56 so that the sprocket wheels 59 rotate with the shaft 56 in the direction of arrow N.

As shown in FIG. 6, there is a belting between the output shaft 63 of the belt drive 66 and a bracket wheel 62 which is rotated by the output shaft 63. A belt 67 (marked with two lines on FIG. 6, indicating its borders) is moved by the bracket wheel 62. The belt 67 rotates a bracket wheel 68 and this bracket wheel 68 rotates shaft 55 together with a bracket wheel 69. The bracket wheel 69 moves belt 70 whereas the belt 70 rotates bracket wheel 76 together with shaft 56. The belting between bracket wheel 62 and bracket wheel 68 is covered with protective case 61 while the belting between bracket wheels 69 and 60 is covered with a protective case 64.

The web removing apparatus 50 further includes a waste web removal conveyor 72 which is moving in the direction indicated by arrows P and Q. The action of the teeth 60 on the sprocket wheel 59 urges the waste dough web strips 101 upwardly where they contact the moving surface of conveyor belt 72 which removes the waste dough web strips 01 from the doughbits 100 and takes the waste strip 101 on the conveyor belt 72 in the direction of arrow Q. The teeth 60 also keep the doughbits 100 in contact with the conveyor 75 and prevent the products 100 from lifting back as the web waste web strips 101 are being removed. When the waste web strips 101 has been removed, the doughbits 100 are carried on conveyor belt 75 and pass through the spaces provided between adjacent sprocket wheels 59 of the web removal members 51, 52, 53.

The method of operation of the cutting apparatus 1 and the waste dough sheet web removing apparatus will now be described. In use, a dough strip which is approximately 1051 mm in width is moved on a conventional conveyer belt to a location underneath the cutting apparatus 1. The cutting apparatus 1 moves up and down vertically whereby in the "down" position, each of the cutting positions 6 on the cutting device 2 is in contact with the dough sheet such that each cutting position 6 cuts out a generally oval-shaped doughbit 100 which is 38 mm in width. Thus, there is a column shown as B, C or D on FIG. 4, each column comprising of twenty doughbits 100 cut out at a single downward stroke of the cutting apparatus 1. Because of the zero distance between the profile of each cutting position 6 in the longitudinal direction, this produces doughbits 100 in parallel rows F arranged in abutment with each other, as shown in FIG. 4.

This strip of dough shown in FIG. 4 is then carried on a conveyer belt to a self-threading waste dough sheet web removing apparatus 50. The web removing apparatus is capable of removing the web waste strips 101 of dough which are provided between the rows F of doughbits 100, without causing tearing to the dough sheet. If the web waste strips 101 do become torn, the web removing apparatus 50 still has the ability to remove the web.

Spacing between batches of products can be achieved using conventional conveyor belts operating at variable speeds.

It will of course be understood that the invention is not limited to the specific details as herein described, which are given by way of example only, and that various alterations and modifications may be made without departing from the scope of the invention as defined by the appended claims.

What is claimed is:

1. A dough handling apparatus comprising a dough cutting apparatus including a plurality of dough cutting members, each dough cutting member being adapted to be brought into contact with a travelling strip of dough for cutting a desired shape out of the strip of dough, each dough cutting member being spaced apart by a predetermined distance from an adjacent cutting member in a plane across the dough cutting apparatus which is transverse to the direction of travel of the strip of dough so that when each cutting member cuts a dough cut-out from the strip of dough, a relatively narrow web of waste dough is produced in the region between adjacent dough cutting members, and a waste dough web removing apparatus for separating the waste dough web from the dough cut-outs, the web removing apparatus including at least one finger for urging the waste dough web upwardly for removal from the dough cut-outs while enabling the dough cut-outs to remain in situ.

2. A dough handling apparatus as claimed in claim 1, wherein the dough cutting members are arranged linearly transversely across the dough cutting apparatus so that, in use, a single stroke of the cutting apparatus produces a line of dough cut-outs from the strip of dough with a waste dough web separating adjacent dough cut-outs in the transverse plane.

3. A dough handling apparatus as claimed in claim 1, in which each cutting member is adapted to make sequential cutting strokes in a travelling longitudinal strip of dough passing beneath the cutting apparatus on a moving conveyor, the cutting strokes being timed and spaced so that the distance between adjacent dough cut-outs in the longitudinal plane which is perpendicular to the transverse plane of the apparatus is zero and the dough cut-outs produced by a given cutting member are arranged in a column parallel to the direction of travel with a longitudinally extending web of waste dough being produced between adjacent columns.

4. A dough handling apparatus as claimed in claim 1, wherein each dough cutting member is fixedly mounted on a stamping apparatus so that in use, on a downward stroke of the stamping apparatus, the dough cutting member is brought into contact with the strip of dough, thereby cutting the desired shape in the dough.

5. A dough handling apparatus as claimed in claim 1, wherein the cutting profile of each dough cutting member is generally oval so that each dough cutout produced from the dough strip is generally oval in shape.

6. A dough handling apparatus as claimed in claim 1, wherein the dough cutting apparatus comprises a pre-determined number of dough cutting members so that with a single downward stroke of the dough cutting apparatus, the corresponding number of dough cut-outs are produced.

7. A dough handling apparatus as claimed in claim 1, wherein in use, the dough cutting members are brought into contact with the strip of dough which is moving on a conveyor belt underneath the cutting apparatus.

8. A dough handling apparatus as claimed in claim 1, wherein the at least one finger comprises a sprocket wheel having a plurality of teeth arranged around the rim of said sprocket wheel.

9. A dough handling apparatus as claimed in claim 8, wherein the at least one finger also includes at least one roller rotatably connected to the sprocket wheel.

10. A dough handling apparatus as claimed in claim 1, wherein the web removing apparatus includes a plurality of said fingers arranged at pre-determined separations along the length of a rotatable shaft whereby in use, the dough cut-outs produced by the cutting apparatus pass between adjacent fingers while the waste dough web is urged upwardly.

11. A dough handling apparatus as claimed in claim 10, wherein the waste dough web is urged upwardly by a rotating conveyor.

* * * * *